United States Patent [19]

Suzuki et al.

[11] Patent Number: 5,449,721

[45] Date of Patent: Sep. 12, 1995

[54] THERMOPLASTIC RESIN COMPOSITIONS COMPRISING POLYPHENYLENE ETHER, POLYAMIDE AND FLUOROCARBON RESINS

[75] Inventors: Yasuro Suzuki, Kisarazu; Yasuhito Ijichi, Ichihara, both of Japan

[73] Assignee: Sumitomo Chemical Co., Ltd., Osaka, Japan

[21] Appl. No.: 302,314

[22] Filed: Sep. 8, 1994

[30] Foreign Application Priority Data

Sep. 8, 1993 [JP] Japan .................. 5-223631
Sep. 8, 1993 [JP] Japan .................. 5-223632

[51] Int. Cl.⁶ .................. C08L 27/18; C08L 71/12; C08L 77/06
[52] U.S. Cl. .................. 525/66; 525/68; 525/92 B; 525/149; 525/151
[58] Field of Search .................. 525/149, 151, 66, 68, 525/92

[56] References Cited

U.S. PATENT DOCUMENTS

| | | | |
|---|---|---|---|
| 3,257,357 | 6/1966 | Stamatoff | 528/215 |
| 3,929,930 | 12/1975 | Izawa et al. | 525/392 |
| 4,011,200 | 3/1977 | Yonemitsu et al. | 528/86 |
| 4,107,232 | 8/1978 | Haaf et al. | 525/199 |
| 4,315,086 | 2/1982 | Ueno et al. | 525/391 |
| 4,532,281 | 7/1985 | Lee, Jr. et al. | 525/92 |
| 4,745,157 | 5/1988 | Yates, III et al. | 525/92 |
| 4,839,425 | 6/1989 | Mawatari et al. | 525/92 |
| 4,873,286 | 10/1989 | Gallucci et al. | 525/92 |
| 4,909,961 | 3/1990 | Suzuki et al. | 524/496 |
| 5,219,940 | 6/1993 | Nakano | 525/133 |
| 5,296,533 | 3/1994 | Nagaoka et al. | 524/430 |
| 5,304,422 | 4/1994 | Tanabe et al. | 525/184 |

FOREIGN PATENT DOCUMENTS

| | | |
|---|---|---|
| 56-49753 | 5/1981 | Japan . |
| 59-66452 | 4/1984 | Japan . |
| 1304119 | 12/1989 | Japan . |

*Primary Examiner*—Thomas Hamilton, III
*Attorney, Agent, or Firm*—Cushman, Darby & Cushman

[57] ABSTRACT

Disclosed is a thermoplastic resin composition which comprises:

(A) 10–90 parts by weight of a polyphenylene ether resin,
(B) 90–10 parts by weight of a polyamide resin,
(C) 1–100 parts by weight of a fluorocarbon resin,
(D) 0–30 parts by weight of a compatibilizing agent, and
(E) 0–100 parts by weight of a rubber-like material, amounts of (C), (D) and (E) being based on 100 parts by weight in total of (A) and (B).

The invention provides a thermoplastic resin composition comprising a polyphenylene ether resin and a polyamide resin improved in heat resistance, impact resistance, and flowability, lowered in frictional coefficient and markedly improved in critical PV value by adding a fluorocarbon resin to a PPE/nylon alloy. Further provided is a method for producing a thermoplastic resin composition comprising a polyphenylene ether resin and a polyamide resin which is much improved in slidability.

5 Claims, No Drawings

THERMOPLASTIC RESIN COMPOSITIONS COMPRISING POLYPHENYLENE ETHER, POLYAMIDE AND FLUOROCARBON RESINS

BACKGROUND OF THE INVENTION

The present invention relates to a thermoplastic resin composition which comprises a polyphenylene ether resin and a polyamide resin and is improved in slidability and a method for producing same.

PPE resins are thermoplastic resins superior in various properties such as mechanical properties, heat resistance and dimensional stability. However, the PPE resin alone is considerably inferior in impact characteristics and solvent resistance and furthermore, is inferior in processability because of its high melt viscosity. On the other hand, polyamide resins (hereinafter sometimes referred to as "nylon resins") are thermoplastic resins superior in mechanical properties, solvent resistance and processability, but are inferior in impact resistance and heat resistance and in addition are considerably inferior in dimensional stability due to their high water absorbability and besides undergo much deterioration in mechanical properties owing to absorption of water. In order to offset the defects of these resins, it has been proposed to blend them. However, mere blend of these resins results in loss of the good mechanical properties possessed by them. Therefore, various compatibilizing agents are added to the blends of PPE resins and polyamide resins to improve dispersibility and mechanical properties. These methods are disclosed, for example, in Japanese Patent Kokoku Nos. 60-11966 and 61-10494 and Japanese Patent Kokai Nos. 59-66452 and 56-49753. The thus obtained PPE/polyamide resin compositions are being applied to the electrical and electronic fields and automobile field as materials superior in mechanical properties, heat resistance, solvent resistance, processability, dimensional stability and moisture absorption properties. Utilizing these properties, application of the compositions to sliding parts is also attempted, but scope of the application is restricted since they are greater than nylon in friction coefficient and abrasion wear although they are superior to nylon in critical PV value in sliding.

SUMMARY OF THE INVENTION

An object of the present invention is to provide a thermoplastic resin composition which comprises a polyphenylene ether resin and a polyamide resin and which is markedly excellent in heat resistance, impact resistance and flowability and excellent in general sliding characteristics. Further object is to provide a method for producing the thermoplastic resin composition.

The inventors have found that the above-mentioned properties are markedly improved by adding a fluorocarbon resin composition to the resin composition comprising a polyphenylene ether resin and a polyamide resin.

The inventors have further found that in preparing a resin composition by adding a fluorocarbon resin to a polyphenylene ether resin and a polyamide resin, when the fluorocarbon resin is blended and melt kneaded with the polyphenylene ether resin and the polyamide resin in a specific order, the above properties can be further improved.

That is, the present invention relates to a thermoplastic resin composition improved in slidability which comprises:

(A) 10–90 parts by weight of a polyphenylene ether resin,
(B) 90–10 parts by weight of a polyamide resin,
(C) 1–100 parts by weight of a fluorocarbon polymer,
(D) 0–30 parts by weight of a compatibilizing agent, and
(E) 0–100 parts by weight of a rubber-like material,
(C), (D) and (E) being based on 100 parts by weight in total of (A) and (B).

Furthermore, the present invention relates to a method for producing by a melt kneading machine a thermoplastic resin composition which comprises:

(A) 10–90 parts by weight of a polyphenylene ether resin,
(B) 90–10 parts by weight of a polyamide resin,
(C) 1–100 parts by weight of a fluorocarbon resin,
(D) 0–30 parts by weight of a compatibilizing agent, and
(E) 0–100 parts by weight of a rubber-like material,
(C), (D) and (E) being based on 100 parts by weight in total of (A) and (B), said method comprising adding optionally the compatibilizing agent (D) and the rubber-like material (E) to the polyphenylene ether resin (A) and previously carrying out the first melt kneading; and then adding the polyamide resin (B) and the fluorocarbon resin (C) and optionally the rubber-like material (E) to the melt kneaded product and carrying out the second melt kneading of the mixture.

Moreover, the present invention relates to a method for producing by a melt kneading machine a thermoplastic resin composition improved in slidability which comprises:

(A) 10–90 parts by weight of a polyphenylene ether resin,
(B) 90–10 parts by weight of a polyamide resin,
(C) 1–100 parts by weight of a fluorocarbon resin,
(D) 0–30 parts by weight of a compatibilizing agent, and
(E) 0–100 parts by weight of a rubber-like material,
(C), (D) and (E) being based on 100 parts by weight in total of (A) and (B), said method comprising adding optionally the compatibilizing agent (D) and the rubber-like material (E) to the polyphenylene ether resin (A) and previously carrying out the first melt kneading of the mixture; then adding the polyamide resin (B) and optionally the rubber-like material (E) to the melt kneaded product and carrying out the second melt kneading of the mixture; and adding the fluorocarbon resin (C) and optionally the rubber-like material (E) to the melt kneaded product and carrying out the third melt kneading of the mixture.

Further, the present invention relates to a method for producing by a melt kneading machine a thermoplastic resin composition excellent in slidability which comprises:

(A) 10–90 parts by weight of a polyphenylene ether resin,
(B) 90–10 parts by weight of a polyamide resin,
(C) 1–100 parts by weight of a fluorocarbon resin,
(D) 0–30 parts by weight of a compatibilizing agent, and
(E) 0–100 parts by weight of a rubber-like material, (C), (D) and (E) being based on 100 parts by weight in total of (A) and (B), said method comprising adding the fluorocarbon resin (C) and optionally the compatibilizing agent (D) and the rubber-like material (E) to the polyphenylene ether resin (A) and previously carrying out the first melt kneading; and then adding the polyamide resin (B) and optionally the rubber-like material (E) to the melt kneaded product and carrying out the second melt kneading of the mixture.

DESCRIPTION OF THE INVENTION

The present invention will be explained in detail below.

The polyphenylene ether resin (A) is a polymer obtained by oxidation polymerization of at least one phenol compound represented by the following formula (1) with oxygen or a gas containing oxygen using an oxidation coupling catalyst:

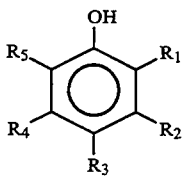

(1)

wherein $R_1$, $R_2$, $R_3$, $R_4$ and $R_5$ each represents a hydrogen atom, a halogen atom or a substituted or unsubstituted hydrocarbon group and at least one of them is a hydrogen atom.

Examples of $R_1$–$R_5$ are hydrogen, chlorine, bromine, fluorine, iodine, methyl, ethyl, n- or isopropyl, pri-, sec- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the compounds represented by the above formula (1) are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol, and 2-methyl-6-allylphenol.

The polyphenylene ether resin can be obtained by oxidation polymerization of at least one phenol compound of the formula (1) and can also be obtained by copolymerization of the phenol compound of the formula (1) with other phenol compounds, for example, polyhydric aromatic compounds such as bisphenol A, tetrabromobisphenol A, resorcin, hydroquinone and novolak resins.

As preferable examples of the polyphenylene ether resins, mention may be made of homopolymers of 2,6-dimethylphenol, homopolymers of 2,6-diphenylphenol, copolymers of a larger amount of 2,6-dimethylphenol and a smaller amount of 3-methyl-6-t-butylphenol or 2,3,6-trimethylphenol.

Any oxidation coupling catalysts may be used for oxidation polymerization of the phenol compound as far as they have polymerization ability. Processes for preparation of the polyphenylene ether resins are described, for example, in U.S. Pat. Nos. 3306874, 3306875 and 3257357, Japanese Patent Kokoku No. 52-17880 and Japanese Patent Kokai Nos. 50-51197 and 1-304119.

Examples of the polyphenylene ether resin (A) are poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4phenylene ether), poly(2,6-dipropyl-1,4-phenylene ether), poly(2-ethyl-6-propyl-1,4-phenylene ether), poly(2,6-butyl-1,4-phenylene ether), poly(2,6-dipropenyl-1,4-phenylene ether), poly(2,6-dilauryl-1,4-phenylene ether), poly(2,6-diphenyl-1,4phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl-1,4-phenylene ether), and various copolymers containing two or more of the recurring units which constitute these polymers. The copolymers include copolymers of polysubstituted phenols such as 2,3,6-trimethylphenol and 2,3,5,6-tetramethylphenol with 2,6-dimethylphenol.

Of these polyphenylene ether resins, preferred are poly(2,6-dimethyl-1,4-phenylene ether) and copolymers of 2,6-dimethylphenol and 2,3,6-trimethylphenol.

Molecular weight of the polyphenylene ether resin usable in the present invention varies in its suitable range depending on the object and cannot be generically specified, but usually it is 0.1–0.8 dl/g, preferably 0.2–0.6 dl/g in terms of intrinsic viscosity measured in chloroform of 30° C.

The polyphenylene ether resins further include the aforementioned polymers and copolymers modified by grafting thereon styrene monomers such as styrene and α-styrene. Mixtures of the aforementioned polymers and copolymers with styrene resins containing the styrene monomers are also included.

The amount of the styrene resin grafted on or mixed with the aforementioned polymers or copolymers is desirably 500 parts by weight or smaller based on 100 parts by weight of the polyphenylene ether. If it is larger than 500 parts by weight, heat resistance of the thermoplastic resin composition considerably decreases.

The polyamide resin (B) is one or more polyamide resins selected from homopolyamides and copolyamides obtained by polymerization of lactams or aminocarboxylic acids or polycondensation of diamines and dicarboxylic acids. Mixtures of them are also included.

Examples of the polyamide resins are nylon 6, nylon 66, nylon 46, nylon 10, nylon 11, nylon 12, nylon MXD 6 which is a copolymer of m-xylylenediamine and adipic acid, nylon 66/6 copolymer, copolyamide of p-aminomethylbenzoic acid and ε-caprolactam (nylon AHBA/6), and polyamides mainly composed of 2,2,4- /2,4,4-trimethylhexamethylenediamine terephthalates (nylon THDT, THDT/6I). These are unlimited.

Blending ratio of the polyphenylene ether resin (A) and the polyamide resin (B) is 10–90 parts by weight of the polyphenylene ether resin and 90–10 parts by weight of the polyamide resin. Preferably, content of the former is 20–80 parts by weight and that of the latter is 80–20 parts by weight and more preferably, that of the former is 25–60 parts by weight and that of the latter is 75–40 parts by weight.

The fluorocarbon resin (C) means a synthetic polymer containing fluorine atom (F) in the molecule and is generally superior in heat resistance, chemical resistance and electric characteristics (especially, high-frequency characteristics) to other synthetic resins and possesses peculiar low frictional characteristics and non-tackiness. Typical examples are those which have the following structural formulas and they are used each alone or in admixture of two or more.

(1) $[CF_2CF_2]_n$: Tetrafluoroethylene resin (PTFE)

(2) $[CF_2CF_2CF(CF_3)CF_2]_n$: Tetrafluoroethylene-hexafluoropropylene copolymer (FEP)

(3) $[(CF_2CF_2)_n(CF(OR)CF_2)]_p$: Tetrafluoroethylene-perfluoroalkylvinyl ether copolymer (PFA)

(4) $[CF_2CF_2—CF(CF_3)CF_2—CH(OR)CF_2]_n$: Tetrafluoroethylene-hexafluoropropylene -perfluoroalkylvinyl ether copolymer (EPE), wherein R represents alkyl fluoride group $C_nF_{2n+1}$ (5) $[CH_2CH_2CF_2CF_2]_n$: Tetrafluoroethylene-ethylene copolymer resin (ETFE)

(6) $[CH_2CH_2CFClCF_2]_n$: Trifluorochloroethylene resin (ECTFE)

(7) $[CF_2CH_2]_n$: Vinylidene fluoride resin (PVDF)

(8) $[CFClCF_2]_n$: Polychlorotrifluoroethylene (PCTFE)

(9) $[CF_2CHF]_n$: Polyvinyl fluoride (PVF)

Of these fluorocarbon resins, tetrafluoroethylene resin (PTFE) which is completely fluorinated is particularly superior in the properties and is most preferred.

Amount of the fluorocarbon resin (C) is 1–100 parts by weight based on 100 parts by weight in total of 10–90 parts by weight of the polyphenylene ether resin (A) and 90–10 parts by weight of the polyamide resin (B). If the amount of the fluorocarbon resin (C) is smaller than 1 part by weight, improvement in sliding characteristics of the resulting resin composition is not sufficient. If it is larger than 100 parts by weight, mechanical properties and processability of the resin composition are inferior. The amount is preferably 2–60 parts by weight, more preferably 5–50 parts by weight.

The compatibilizing agent (D) is a compound added to improve the affinity between the polyphenylene ether resin (A) and the polyamide resin (B) to increase the compatibility of them. Examples of them are the following ①-⑨, but these are not limitative and any compounds which can improve the compatibility of PPE and the polyamide resin can be used. These compatibilizing agents may be added at the time of mixing PPE with the polyamide resin or may be previously mixed or allowed to react at the time of polymerization of PPE or the polyamide resin.

①: Epoxy compounds having neither ethylenic nor acetylenic unsaturated bonds.

②: Compounds having in one molecule both (i) at least one unsaturated group, namely, carbon-carbon double bond or carbon-carbon triple bond and (ii) at least one polar group.

③: Oxidized polyolefin waxes.

④: Silane compounds having in their molecular structure both (i) a carbon atom through a bridge of oxygen and (ii) at least ethylenic carbon-carbon double bond or carbon-carbon triple bond and/or functional group selected from amino group and mercapto group with a proviso that said functional group does not directly bond to silicon atom.

⑤: Compounds having in one molecule both (i) (OR), where R is a hydrogen atom, an alkyl group, an aryl group, an acyl group or a carbonyldioxy group, and (ii) at least two same or different functional groups selected from carboxyl group, acid halide group, acid anhydride group, acid halide anhydride group, acid ester group, acid amide group, imide group, amino group and salts thereof.

⑥: Compounds having in one molecule both (i) acid halide group and (ii) at least one of carboxyl group, carboxylic anhydride group, acid ester group and acid amide group.

⑦: Copolymers having unit of vinyl aromatic compounds and unit of α, β-unsaturated dicarboxylic acids or dicarboxylic acid anhydrides or unit of vinyl aromatic compounds and unit of imide compounds of α, β-unsaturated dicarboxylic acids.

⑧: Polyphenylene ethers made functional with at least one compatibilizing agent selected from the above groups ①-② and ④-⑥.

⑨: Compositions obtained by melt kneading a polyphenylene ether made functional with at least one compatibilizing agent selected from the above groups ①-⑦ and a small amount of a polyamide.

The compatibilizing agents of the group ① include (1) condensates of polyhydric phenols (such as bisphenol A, tetrabromobisphenol A and resorcin) with epichlorohydrin and (2) condensates of polyhydric alcohols (such as ethylene glycol, propylene glycol and polyethylene glycol) with epichlorohydrin.

The compatibilizing agents of the group ② include compounds having in one molecule both an unsaturated group, namely, carbon-carbon double bond or carbon-carbon triple bond and a polar group, namely, functional group having affinity for or chemical reactivity with the amide bond contained in the polyamide resin or carboxyl group or amino group present at the end of chains.

As the functional group, mention may be made of carboxyl group, functional groups such as those derived from carboxylic acids, namely, groups obtained by substitution for hydrogen atom or hydroxyl group of carboxyl group, such as salt or ester groups, acid amide group, acid anhydride group, imide group, acid azide group and acid halide group, oxazoline group and nitrile group; epoxy group, amino group, hydroxyl group and isocyanate ester group and there may be used compounds having both the unsaturated group and the polar group, namely, unsaturated carboxylic acids, unsaturated carboxylic acid derivatives, unsaturated epoxy compounds, unsaturated alcohols, unsaturated amines and unsaturated isocyanate esters.

Examples are maleic acid, maleic anhydride, fumaric acid, maleimide, maleic hydrazide and reaction products of maleic anhydrides and diamines, for example, those having the structure represented by the following formula (2) or (3):

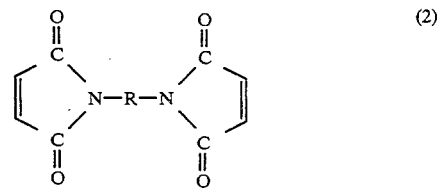

(2)

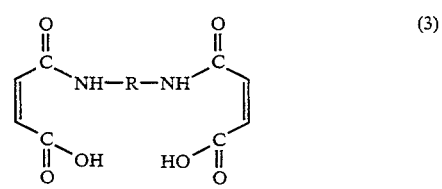

(3)

wherein R represents an aliphatic or aromatic group. Further examples are methylnadic anhydride, dichloromaleic anhydride, maleinamide, iraconic acid, itaconic anhydride; natural fats and oils such as soybean oil, tung oil, caster oil, linseed oil, hempseed oil, cottonseed oil, sesame oil, rapeseed oil, peanut oil, tsubaki oil, olive oil, coconut oil, and sardine oil; epoxidized natural fats and oils; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α- ethylacrylic acid, ⊖-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid and octacosenoic acid, and furthermore, esters, acid amides and anhydrides of these unsaturated carboxylic acids.

Further examples are unsaturated alcohols such as allyl alcohol, crotyl alcohol, methylvinylcarbinol, allylcarbinol, methylpropenylcarbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol; alcohols represented by the formulas $C_nH_{2n-5}OH$, $C_nH_{2n-7}OH$, and $C_nH_{2n-9}OH$, wherein n is a positive integer, 3-butene-1,2-diol, 2,5-dimethyl-3-hexene-2,5-diol, 1,5-hexadiene-3,4-diol, and 2,6-octadiene-4,5-diol; unsaturated amines prepared by substituting the OH group of these unsaturated alcohols with -NH$_2$ group; glycidyl (meth)acrylate, and allyl glycidyl ether.

Further examples are low molecular weight polymers, for example, having an average molecular weight of about 500-10,000 or high molecular weight polymers, for example, having an average molecular weight of more than 10000 such as of butadiene and isoprene to which maleic anhydride or a phenol is added or into which amino group, carboxyl group, hydroxyl group or epoxy group is introduced, and allyl isocyanate.

It is needless to say that the compounds having in one molecule both the unsaturated group and the polar group include compounds containing two or more unsaturated groups and two or more same or different polar groups. It is also possible to use two or more of specific compounds. Details of these compounds are described in Japanese Patent Kokai Nos. 56-26913 and 56-49753.

Among them, preferred are maleic anhydride, maleic acid, fumaric acid, itaconic anhydride, iraconic acid, glycidyl (meth)acrylate and more preferred are maleic anhydride and fumaric acid.

The comptibilizing agents of the group ③ are usually prepared by oxidizing polyolefin waxes in the air or in suspension, and polyethylene wax is suitable.

The compatibilizing agents of the group ④ are silane compounds having in the molecular structure both (i) at least one silicon atom which bonds to a carbon atom through oxygen bridge and (ii) at least a functional group selected from ethylenic carbon-carbon double bond or carbon-carbon triple bond and/or a functional group selected from amino group and mercapto group, said functional group being not bonded to silicon atom. Examples of the silane compounds are γ-aminopropyltriethoxysilane and 2-(3-cyclohexyl)ethyltrimethoxysilane.

The compatibilizing agents of the group ⑤ are aliphatic polycarboxylic acids, acid esters or acid amides thereof and are saturated aliphatic polycarboxylic acids and derivatives thereof represented by the following formula: $(R_1O)_mR(COOR_2)_n(CONR_3R_4)_l$, wherein R represents a linear or branched chain saturated aliphatic hydrocarbon group of 2-20, preferably 2-10 carbon atoms; $R_1$ represents a hydrogen atom, an alkyl group, an aryl group, an acyl group or a carbonyldioxy group, especially preferably a hydrogen atom; $R_2$ represents a hydrogen atom or an alkyl or aryl group of 1-20, preferably 1-10 carbon atoms; $R_3$ and $R_4$ each represents a hydrogen atom or an alkyl or aryl group of 1-10, preferably 1-6, more preferably 1-4 carbon atoms; $m=1, n+1$ is an integer of 2 or more, preferably 2 or 3, n is an integer of 0 or more, 1 is an integer of 0 or more; and (R1O) is at α or ⊖ position of the carbonyl group and 2-6 carbon atoms are present between at least two carbonyl groups.

Examples are ester compounds, amide compounds, anhydrides, hydrates and salts of the saturated aliphatic polycarboxylic acids. Examples of the saturated aliphatic polycarboxylic acids are citric acid, malic acid and agaricic acid. Details of these compounds are disclosed in Patent Kohyo No. 61-502195.

The compatibilizing agents of the group ⑥ are one or more compounds represented by the formula: (I)—Z—(II), wherein (I) is at least a group of the formula (X—CO)—, wherein X is F, Cl, B, I, OH, OR or —O—CO—R, wherein R is H, an alkyl group or an aryl group; (II) is at least a carboxyl group, an acid anhydride group, an acid amide group, an imide group, a carboxylate group, an amino group or a hydroxyl group, and the groups (I) and (II) covalently bond through linkage Z which is a divalent hydrocarbon.

Examples of the above compounds are chloroformylsuccinic anhydride, chloroethanoylsuccinic anhydride, anhydrotrimellitic acid chloride, anhydrotrimellitic acetic anhydride and terephthalic acid chloride.

Examples of the compatibilizing agents of the group ⑦ are styrene-maleic anhydride copolymer resins.

The compatibilizing agents (D) used in the present invention are not limited to the above-mentioned compounds of groups ①-⑨ and may be any compounds which are used for improving the compatibility between the polyphenylene ether resin (A) and the polyamide resin (B). These may be used each alone or in combination of two or more. Of these compatibilizing agents, maleic anhydride is most preferred.

Amount of the compatibilizing agent (D) is 0-30 parts by weight, preferably 0.01-30 parts by weight on the basis of 100 parts by weight in total of the polyphenylene ether resin (A) and the polyamide resin (B). If the amount exceeds 30 parts by weight, strength reduces considerably due to decrease in heat resistance or decomposition. The amount is more preferably 0.05-25 parts by weight. Radical initiators may be used at the time of adding the compatibilizing agent.

The rubber-like material (E) includes natural and synthetic polymer materials which are elastic at room temperature and are used for improving impact characteristics.

Examples are ethylene-propylene copolymer rubber, ethylene-propylene-nonconjugated diene copolymer rubber, ethylene-butene-1 copolymer rubber, polybutadiene, styrene-butadiene block copolymer rubber, styrene-butadiene copolymer rubber, partially hydrogenated styrene-butadiene-styrene block copolymer rubber, styrene-isoprene block copolymer rubber, partially hydrogenated styrene-isoprene block copolymer rubber, polyurethane rubber, styrene-grafted ethylene-propylene-nonconjugated diene copolymer rubber, styrene-grafted ethylene-propylene copolymer rubber, styrene/acrylonitrile-grafted ethylene-propylene-nonconjugated diene copolymer rubber, styrene/acrylonitrile-grafted ethylene-propylene copolymer rubber and mixtures thereof. Furthermore, there may be used rubbers modified with other functional monomers containing acids, epoxy or the like.

Amount of the rubber-like materials (E) is 0–100 parts by weight, preferably 5–100 parts by weight based on 100 parts by weight in total of the polyphenylene ether resin (A) and the polyamide resin (B). If the amount exceeds 100 parts by weight, rigidity of the resin compositions markedly decreases.

The thermoplastic resin composition of the present invention can be prepared by various methods such as solution blending and melt kneading, and melt kneading is preferable. One example of the method of melt kneading comprises making the above components into a uniform mixture by mixing means employed for mixing resins or mixing a resin with liquid or solid additives such as Henschel mixer, super mixer, ribbon blender and V blender and kneading the resulting mixture by kneading means such as Banbury mixer, plastomill, Brabender Plastograph, and single- or twin-screw extruder.

A kneading temperature of 150°–400° C., preferably 200°–350° C. can be selected.

When melt kneading method is employed for preparing the thermoplastic resin composition of the present invention, the order of adding and kneading the components is optional.

For example, when the melt kneading is carried out by extruder or the like, optional combinations of the components may be separately kneaded and then all of the combinations may be mixed and kneaded. Alternatively, one or more of the components may be successively fed from a plurality of feed openings provided at one extruder along the cylinder.

Specifically, the preferred method of the present invention is a method for producing by a melt kneading machine a thermoplastic resin composition which comprises:
(A) 10–90 parts by weight of a polyphenylene ether resin,
(B) 90–10 parts by weight of a polyamide resin,
(C) 1–100 parts by weight of a fluorocarbon resin,
(D) 0–30 parts by weight of a compatibilizing agent, and
(E) 0–100 parts by weight of a rubber-like material,
(C), (D) and (E) being based on 100 parts by weight in total of (A) and (B), said method comprising adding optionally the compatibilizing agent (D) and the rubber-like material (E) to the polyphenylene ether resin (A) and previously carrying out the first melt kneading; and then adding the polyamide resin (B) and the fluorocarbon resin (C) and optionally the rubber-like material (E) to the melt kneaded product and carrying out the second melt kneading of the mixture.

Moreover, another preferred method of the present invention is a method for producing by a melt kneading machine a thermoplastic resin composition improved in slidability which comprises:
(A) 10–90 parts by weight of a polyphenylene ether resin,
(B) 90–10 parts by weight of a polyamide resin,
(C) 1–100 parts by weight of a fluorocarbon resin,
(D) 0–30 parts by weight of a compatibilizing agent, and
(E) 0–100 parts by weight of a rubber-like material,
(C), (D) and (E) being based on 100 parts by weight in total of (A) and (B), said method comprising adding optionally the compatibilizing agent (D) and the rubber-like material (E) to the polyphenylene ether resin (A) and previously carrying out the first melt kneading; then adding the polyamide resin (B) and optionally the rubber-like material (E) to the melt kneaded product and carrying out the second melt kneading of the mixture; and adding the fluorocarbon resin (C) and optionally the rubber-like material (E) to the melt kneaded product and carrying out the third melt kneading of the mixture.

Further, another preferred method of the present invention is a method for producing by a melt kneading machine a thermoplastic resin composition excellent in slidability which comprises:
(A) 10–90 parts by weight of a polyphenylene ether resin,
(B) 90–10 parts by weight of a polyamide resin,
(C) 1–100 parts by weight of a fluorocarbon resin,
(D) 0–30 parts by weight of a compatibilizing agent, and
(E) 0–100 parts by weight of a rubber-like material,
(C), (D) and (E) being based on 100 parts by weight in total of (A) and (B), said method comprising adding the fluorocarbon resin (C) and optionally the compatibilizing agent (D) and the rubber-like material (E) to the polyphenylene ether resin (A) and previously carrying out the first melt kneading; and adding the polyamide resin (B) and optionally the rubber-like material (E) to the melt kneaded product and carrying out the second melt kneading of the mixture.

The more preferable order of kneading is such that the polyphenylene ether resin (A) and the compatibilizing agent (D) have been kneaded before the polyamide resin (B) is added.

The more preferred method of the present invention is a method for producing by a melt kneading machine a thermoplastic resin composition which comprises:
(A) 10–90 parts by weight of a polyphenylene ether resin,
(B) 90–10 parts by weight of a polyamide resin,
(C) 1–100 parts by weight of a fluorocarbon resin,
(D) 0.01–30 parts by weight of a compatibilizing agent, and
(E) 0–100 parts by weight of a rubber-like material,
(C), (D) and (E) being based on 100 parts by weight in total of (A) and (B), said method comprising adding the compatibilizing agent (D) and optionally the rubber-like material (E) to the polyphenylene ether resin (A) and previously carrying out the first melt kneading of the mixture; and then adding the polyamide resin (B) and the fluorocarbon resin (C) and optionally the rubber-like material (E) to the melt kneaded product and carrying out the second melt kneading of the mixture.

Moreover, another more preferred method is a method for producing by a melt kneading machine a thermoplastic resin composition improved in slidability which comprises:

(A) 10–90 parts by weight of a polyphenylene ether resin,
(B) 90–10 parts by weight of a polyamide resin,
(C) 1–100 parts by weight of a fluorocarbon resin,
(D) 0.01–30 parts by weight of a compatibilizing agent, and
(E) 0–100 parts by weight of a rubber-like material,
(C), (D) and (E) being based on 100 parts by weight in total of (A) and (B), said method comprising adding the compatibilizing agent (D) and optionally the rubber-like material (E) to the polyphenylene ether resin (A) and previously carrying out the first melt kneading of the mixture; then adding the polyamide resin (B) and optionally the rubber-like material (E) to the melt kneaded product and carrying out the second melt kneading of the mixture; and adding the fluorocarbon resin (C) and optionally the rubber-like material (E) to the melt kneaded product and carrying out the third melt kneading of the mixture.

Further, another more preferred method is a method for producing by a melt kneading machine a thermoplastic resin composition excellent in slidability which comprises:

(A) 10–90 parts by weight of a polyphenylene ether resin,
(B) 90–10 parts by weight of a polyamide resin,
(C) 1–100 parts by weight of a fluorocarbon resin,
(D) 0.01–30 parts by weight of a compatibilizing agent, and
(E) 0–100 parts by weight of a rubber-like material,
(C), (D) and (E) being based on 100 parts by weight in total of (A) and (B), said method comprising adding the fluorocarbon resin (C) and the compatibilizing agent (D) and optionally the rubber-like material (E) to the polyphenylene ether resin (A) and previously carrying out the first melt kneading; and adding the polyamide resin (B) and optionally the rubber-like material (E) to the melt kneaded product and carrying out the second melt kneading of the mixture.

In this case, in the course of kneading of the components in accordance with the order as specified in the present invention, the resin composition may be obtained by taking out the kneaded components from the melt kneading machine every time of the kneading and mixing the thus kneaded components with newly added component at the next kneading, then again introducing the mixture into the melt kneading machine and melt kneading the mixture or by carrying out continuous melt kneading with successively adding the components without taking out the melt kneaded product from the melt kneading machine. For example, when the melt kneading is carried out by one extruder, each of the components may be successively fed from a plurality of feed openings along the cylinder in accordance with the order of the kneading.

The resin composition of the present invention may further contain various other materials. Examples of these materials are inorganic or organic fillers for improvement of rigidity or hardness, flame retardants, stabilizers, plasticizers and lubricants.

Preferred inorganic and organic fillers include calcium carbonate, magnesium carbonate, aluminum hydroxide, magnesium hydroxide, zinc oxide, titanium oxide, aluminum silicate, magnesium silicate, calcium silicate, silicic acid, hydrated calcium silicate, hydrated aluminum silicate, mica, mineral fibers, xonotlite, potassium titanate whiskers, magnesium oxysulfate, glass balloons, inorganic fibers such as glass fibers, glass beads, carbon fibers and stainless steel fibers, aramid fibers and carbon black. These fillers may be added each alone or in combination of two or more. These fillers are not limitative.

Examples of the flame retardants are phosphate esters such as triphenyl phosphate, tricresyl phosphate, phosphates obtained from mixtures of isopropylphenol and phenol, and phosphates obtained from mixtures of bifunctional phenols such as benzohydroquinone or bisphenol A and other alcohols or phenols; red phosphorus; antimony compounds; brominated compounds such as decabromobiphenyl, pentabromotoluene, decabromodiphenyl ether, hexabromobenzene, brominated polystyrenes and brominated epoxy resins; and nitrogen-containing compounds such as melamine and melamine triisocyanurate. These may be used each alone or in admixture of two or more.

Examples of the stabilizers are steric hindrance phenols, organic phosphites, diazide oxalate and steric hindrance amines, and examples of the lubricants are polyethylene wax and paraffins.

Amounts of the other materials can be optionally selected depending on the objects, but in general, that of the flame retardant is 50 parts by weight or less, preferably 1–20 parts by weight, that of the stabilizer is 20 parts by weight or less, preferably 0.001–10 parts by weight, and that of the lubricant is 2 parts by weight or less based on 100 parts by weight in total of the polyphenylene ether resin (A) and the polyamide resin (B).

Examples of uses of the thermoplastic resin composition of the present invention improved in slidability include various parts, especially those which require slidability, namely, those which require low frictional coefficient or good wear resistance.

The following nonlimiting examples illustrate the present invention.

The abbreviations used in the examples and comparative examples have the following meanings.

PPE: Poly(2,6-dimethyl-1,4-phenylene ether) having an intrinsic viscosity of 0.46 dl/g measured in chloroform at 30° C.

PA: Polyamide-6 (A1030BRL manufactured by Unitika, Ltd.).

Fluorocarbon resin: PTFE (RUBLON 169 manufactured by Asahi Glass Co., Ltd.)

SBS: Styrene-butadiene-styrene triblock copolymer (CALIFLEX TR1101 manufactured by Shell Chemical Co.)

MAH: Maleic anhydride as a compatibilizing agent

The frictional wear properties were measured in the following manner.

Tester: Suzuki Frictional Wear tester
Frictional material: SUS55C
Conditions for measurement of kinetic frictional coefficient: Load 2.5 kg/cm$^2$; Speed 30 m/min Conditions for measurement of critical PV value: Load 10 kg/cm$^2$; The product of speed and pressure just before abnormal wear occurs is the critical PV value.

Mechanical properties were measured in the following manner.

Tensile test: ASTM D638
Flexural test: ASTM D790
Izod impact strength (3.2 mmt): ASTM D256

EXAMPLE 1

PPE (44 parts by weight), fluorocarbon resin (11 parts by weight) and MAH (0.5 part by weight) were introduced from the first hopper of a continuous twin-screw kneader (TEM-50 manufactured by Toshiba Machine Co., Ltd.) and were melt kneaded. Then, PA (56 parts by weight) was introduced using a weigh-feeder from the second hopper provided between the first hopper and a vent and melt kneaded and granulated to obtain a thermoplastic resin composition. In this case, the granulation conditions were a cylinder temperature of 260° C. and a screw revolution rate of 330 rpm. The resulting composition was injection molded at 280° C. to make a test piece for wear test (a hollow cylinder of outer diameter: 25.6 mm, inner diameter: 20 mm and height: 15 mm), and frictional wear test was conducted. Similarly, a test piece for measurement of mechanical properties was made and mechanical properties were evaluated.

The blending compositions and order of kneading are shown in Table 1 and test results are shown in Table 2.

EXAMPLE 2

Example 1 was repeated except that PA (56 parts by weight) and additionally SBS (5 parts by weight) were introduced from the second hopper. The blending compositions and the order of kneading are shown in Table 1 and the test results are shown in Table 2.

EXAMPLE 3

Example 1 was repeated except that PPE (44 parts by weight) and MAH (0.5 part by weight) were introduced from the first hopper and PA (56 parts by weight) and fluorocarbon resin (11 parts by weight) were introduced from the second hopper. The blending compositions and the order of kneading are shown in Table 1 and the test results are shown in Table 2.

EXAMPLE 4

A composition of PPE and PA was obtained in the same manner as in Example 3 except that only PA (56 parts by weight) was introduced from the second hopper. The resulting composition was pelletized. The pellets (100.5 parts by weight) and fluorocarbon resin (11 parts by weight) were mixed and the mixture was again melt kneaded by a continuous twin-screw kneader under the same conditions to obtain the final composition. The properties of this composition were evaluated.

The blending compositions and the order of the kneading are shown in Table 1 and the test results are shown in Table 2.

COMPARATIVE EXAMPLE 1

Example 1 was repeated except that the fluorocarbon resin was not added. The blending compositions and the order of kneading are shown in Table 1 and the test results are shown in Table 2.

COMPARATIVE EXAMPLE 2

Example 2 was repeated except that the fluorocarbon resin was not added. The blending compositions and the order of kneading are shown in Table 1 and the test results are shown in Table 2.

TABLE 1

| Order of kneading | Blending composition | Example 1 | Example 2 | Example 3 | Example 4 | Comparative Example 1 | Comparative Example 2 |
| --- | --- | --- | --- | --- | --- | --- | --- |
| The first kneading | (A) PPE | 44 | 44 | 44 | 44 | 44 | 44 |
| | (C) PTFE | 11 | 11 | 0 | 0 | 0 | 0 |
| | (D) MAH | 0.5 | 0.5 | 0.5 | 0.5 | 0.5 | 0.5 |
| The second kneading | (B) PA6 | 56 | 56 | 56 | 56 | 56 | 56 |
| | (E) SBS | — | 5 | — | — | — | 5 |
| | (C) PTFE | — | — | 11 | — | — | — |
| The third kneading | (C) PTFE | — | — | — | 11 | — | — |

TABLE 2

| Evaluation | Example 1 | Example 2 | Example 3 | Example 4 | Comparative Example 1 | Comparative Example 2 |
| --- | --- | --- | --- | --- | --- | --- |
| Tensile strength (kg/cm$^2$) | 640 | 600 | 640 | 640 | 610 | 590 |
| Flexural rigidity (kg/cm$^2$) | 24400 | 21800 | 24300 | 24000 | 24400 | 21000 |
| Flexural strength (kg/cm$^2$) | 990 | 920 | 990 | 980 | 1040 | 980 |
| Izod impact strength (kg · cm/cm) | 5 | 11 | 5 | 4 | 4 | 25 |
| Kinetic frictional coefficient | 0.31 | 0.33 | 0.27 | 0.28 | 0.48 | 0.45 |
| Critical PV value (kg · m/cm$^2$ · min) | 400 | 400 | 600 | 600 | 200 | 250 |

The frictional coefficient is lowered and the critical PV value is markedly improved by adding a fluorocarbon resin to PPE/nylon alloys. Furthermore, slidability of the compositions of PPE/PA/fluorocarbon resin having the same composition as above which is to be improved in slidability can be further remarkably improved by employing the order of kneading as specified in the present invention.

What is claimed is:

1. A method for producing by a melt kneading machine a thermoplastic resin composition which comprises:
   (A) 10–90 parts by weight of a polyphenylene ether resin,
   (B) 90–10 parts by weight of a polyamide resin,
   (C) 1–100 parts by weight of a fluorocarbon resin,
   (D) 0.01–30 parts by weight of a compatibilizing agent, and
   (E) 0–100 parts by weight of a rubber, wherein the amounts of (C), (D) and (E) are based on 100 parts by weight in total of (A) and (B), and wherein said method comprises adding the compatibilizing agent (D), and optionally the rubber (E) to the polyphenylene ether resin (A) and carrying out a first melt kneading to obtain a melt kneaded product; and then adding the polyamide resin (B) and the fluorocarbon resin (C), and optionally the rubber (E) to said melt kneaded product and carrying out a second melt kneading thereof.

2. A method for producing by a melt kneading machine a thermoplastic resin composition having improved slidability which comprises:
   (A) 10–90 parts by weight of a polyphenylene ether resin,
   (B) 90–10 parts by weight of a polyamide resin,
   (C) 1–100 parts by weight of a fluorocarbon resin,
   (D) 0.01–30 parts by weight of a compatibilizing agent, and
   (E) 0–100 parts by weight of a rubber, wherein the amounts of (C), (D) and (E) are based on 100 parts by weight in total of (A) and (B), and wherein said method comprises adding the compatibilizing agent (D), and optionally the rubber (E) to the polyphenylene ether resin (A) and carrying out a first melt kneading to obtain a first melt kneaded product; then adding the polyamide resin (B) and optionally the rubber (E) to said first melt kneaded product and carrying out a second melt kneading to obtain a second melt kneaded product; and adding the fluorocarbon resin (C) and optionally the rubber (E) to said second melt kneaded product and carrying out a third melt kneading to obtain said thermoplastic resin having improved slidably.

3. A thermoplastic resin composition obtained according to claim 1 or 2, wherein (D) is
   ①: epoxy compounds having neither ethylenic nor acetylenic unsaturated bonds,
   ②: compounds having in one molecule both (i) at least one unsaturated group selected from carbon-carbon double bond or carbon-carbon triple bond and (ii) at least one polar group,
   ③: oxidized polyolefin waxes,
   ④: silane compounds having in their molecular structure both (i) a carbon atom through a bridge of oxygen and (ii) at least ethylenic carbon-carbon double bond or carbon-carbon triple bond and/or functional group selected from amino group and mercapto group with a proviso that said functional group does not directly bond to silicon atom,
   ⑤: compounds having in one molecule both (i) (OR), where R is a hydrogen atom, an alkyl group, an aryl group, an acyl group or a carbonyldioxy group, and (ii) at least two same or different functional groups selected from carboxyl group, acid halide group, acid anhydride group, acid halide anhydride group, acid ester group, acid amide group, imide group, amino group and salts thereof,
   ⑥: compounds having in one molecule both (i) acid halide group and (ii) at least one of carboxyl group, carboxylic anhydride group, acid ester group and acid amide group,
   ⑦: copolymers having unit of vinyl aromatic compounds and unit of α, ⊖-unsaturated dicarboxylic acids or dicarboxylic acid anhydrides or unit of vinyl aromatic compounds and unit of imide compounds of α, ⊖-unsaturated dicarboxylic acids,
   ⑧: polyphenylene ethers made functional with at least one compatibilizing agent selected from the above groups ①-② and ④-⑥, or
   ⑨: compositions obtained by melt kneading a polyphenylene ether made functional with at least one compatibilizing agent selected from the above groups ①-⑦ and a small amount of a polyamide.

4. A thermoplastic resin composition obtained according to claim 1 or 2, wherein the fluorocarbon resin (C) is tetrafluoroethylene resin.

5. A thermoplastic resin composition obtained according to claim 1 or 2, wherein the fluorocarbon resin is at least one resin selected from the group consisting of tetrafluoroethylene resin, tetrafluoroethylene-hexafluoropropylene copolymer, tetrafluoroethylene-perfluoroalkylvinyl ether copolymer, tetrafluoroethylene-hexafluoropropylene-perfluoroalkylvinyl ether copolymer, tetrafluoroethylene-ethylene copolymer resin, trifluorochloroethylene resin, vinylidene fluoride resin, polychlorotrifluoroethylene and polyvinyl fluoride.

* * * * *